(12) United States Patent
Xie et al.

(10) Patent No.: US 11,333,856 B2
(45) Date of Patent: May 17, 2022

(54) OPTICAL LENS ASSEMBLY AND IMAGING DEVICE

(71) Applicant: NINGBO SUNNY AUTOMOTIVE OPTECH CO., LTD., Zhejiang (CN)

(72) Inventors: Qiansen Xie, Zhejiang (CN); Dongfang Wang, Zhejiang (CN); Bo Yao, Zhejiang (CN)

(73) Assignee: NINGBO SUNNY AUTOMOTIVE OPTECH CO., LTD., Zhejiang (CN)

( * ) Notice: Subject to any disclaimer, the term of this patent is extended or adjusted under 35 U.S.C. 154(b) by 181 days.

(21) Appl. No.: 16/498,247

(22) PCT Filed: Mar. 30, 2018

(86) PCT No.: PCT/CN2018/081353
§ 371 (c)(1),
(2) Date: Sep. 26, 2019

(87) PCT Pub. No.: WO2018/177416
PCT Pub. Date: Oct. 4, 2018

(65) Prior Publication Data
US 2020/0026044 A1 Jan. 23, 2020

(30) Foreign Application Priority Data

Mar. 31, 2017 (CN) .......................... 201710208866.5

(51) Int. Cl.
*G02B 13/00* (2006.01)
*G02B 9/60* (2006.01)
*G02B 13/04* (2006.01)

(52) U.S. Cl.
CPC ........... *G02B 13/0045* (2013.01); *G02B 9/60* (2013.01); *G02B 13/006* (2013.01); *G02B 13/04* (2013.01)

(58) Field of Classification Search
CPC ........ G02B 13/0045; G02B 9/60; G02B 9/62; G02B 9/64; G02B 13/001; G02B 13/006; G02B 13/04; G02B 13/06; G02B 13/18
(Continued)

(56) References Cited

U.S. PATENT DOCUMENTS 7,283,312 B2 * 10/2007 Kawada .................. G02B 13/06 359/725
2012/0056978 A1 * 3/2012 Abe ........................ G02B 13/06 348/36

(Continued)

FOREIGN PATENT DOCUMENTS

CN 2001-066523 A 3/2001
CN 2009-230040 A 10/2009
(Continued)

OTHER PUBLICATIONS

International Search Report (PCT/ISA/210) issued in PCT/CN2018/081353, dated Jul. 16, 2018.

*Primary Examiner* — Jordan M Schwartz
(74) *Attorney, Agent, or Firm* — Birch, Stewart, Kolasch & Birch, LLP (57) ABSTRACT

An optical lens assembly and an imaging device. The optical lens assembly includes, in order from an object side to an image side: a first lens (L1) being a meniscus lens having a negative focal power, the first lens having an object side surface (S1) being a convex surface, and an image side surface (S2) being a concave surface; a second lens (L2) having a negative focal power, an image side surface (S4) of the second lens being a concave surface; a third lens (L3) being a meniscus lens having a positive focal power, the third lens having an object side surface (S5) being a concave surface, and an image side surface (S6) being a convex surface; a fourth lens (L4); a fifth lens (L5) cemented to the
(Continued)

fourth lens; and a sixth lens (L6) having a positive focal power.

18 Claims, 3 Drawing Sheets

(58) Field of Classification Search
USPC .................. 359/762, 713, 708, 749–751
See application file for complete search history.

(56) References Cited

U.S. PATENT DOCUMENTS

| | | | |
|---|---|---|---|
| 2014/0340769 A1* | 11/2014 | Shimada | G02B 13/006 359/754 |
| 2015/0062720 A1* | 3/2015 | Lai | G02B 3/02 359/713 |
| 2016/0187625 A1 | 6/2016 | Lin | |
| 2017/0219820 A1* | 8/2017 | Kobayashi | G02B 13/06 |
| 2017/0307857 A1* | 10/2017 | Ning | G02B 9/62 |
| 2018/0210177 A1* | 7/2018 | Liu | G02B 13/04 |
| 2018/0341089 A1* | 11/2018 | Nakamura | G02B 13/04 |
| 2019/0278055 A1* | 9/2019 | Lin | G02B 9/64 |
| 2020/0301105 A1* | 9/2020 | Jung | G02B 13/04 |

FOREIGN PATENT DOCUMENTS

| | | |
|---|---|---|
| CN | 102483514 A | 5/2012 |
| CN | 103576290 A | 2/2014 |
| CN | 104407430 A | 3/2015 |
| CN | 106405792 A | 2/2017 |
| CN | 106501922 A | 3/2017 |
| JP | 2004-29282 A | 1/2004 |
| JP | 2015-190999 A | 11/2015 |

\* cited by examiner

OPTICAL LENS ASSEMBLY AND IMAGING DEVICE

CROSS REFERENCE TO RELATED APPLICATIONS

This application is a U.S. National Stage Application of International Patent Application No. PCT/CN2018/081353, filed on Mar. 30, 2018, which claims priority to and benefit of China Patent Application No. 201710208866.5, filed on Mar. 31, 2017.

TECHNICAL FIELD

The present invention relates to the field of optical lens assemblies and imaging devices, and in particular to an optical lens assembly and an imaging device capable of obtaining high resolution while maintaining the miniaturization of the lens assembly.

TECHNICAL BACKGROUND

Imaging devices, such as camera-mounted mobile devices and digital still cameras, use, for example, charge coupled devices (CCD) and complementary metal oxide semiconductors (CMOS) as solid-state imaging elements, and such imaging devices are well known.

With the development of science and technology, the resolution requirements of optical lens assemblies are becoming higher and higher, and constantly increasing from the original megapixel to the tens of millions of pixels, and high-pixel lenses assembly are becoming more and more popular.

In addition, with the spread of mobile devices, it is required to apply more and more small-sized imaging devices, such as imaging devices applied to mobile phones, which are very demanding for small sizes.

In general, the resolution can be improved by increasing the number of lenses in the optical lens assembly, but accordingly, the volume and weight of the optical lens assembly are increased, which is disadvantageous for miniaturization of the optical lens assembly and at the same time, causes an increase in cost.

At present, wide-angle optical lens assemblies of megapixels or more usually use six lenses. Although the resolution is significantly improved compared with an optical lens assembly with five lenses, the increase in the number of lenses makes the demand for miniaturization more prominent.

In a conventional case, in order to meet the demand for miniaturization of the optical lens assembly, a scheme of compressing the total optical length of the lens assembly is usually employed, but the resolution is significantly affected. At the same time, it is also possible to improve the image quality by adding an aspherical lens. However, the cost of the glass aspherical lens is high, and yet the excessive use of the plastic aspheric lens will cause the temperature performance of the lens to deteriorate.

In particular, for a lens assembly operating in an outdoor environment, such as a surveillance lens assembly or a vehicle-mounted lens assembly, on the one hand, the operating environment is variable, and it is necessary to maintain perfect resolution and definition regardless of hot high-temperature days and cold rainy and snowy days. On the other hand, its installation space is limited. Therefore, how to obtain the highest possible imaging quality while ensuring the miniaturization of the optical lens assembly has become an urgent problem to be solved.

Therefore, there is a need for an improved optical lens assembly and imaging device.

SUMMARY OF THE INVENTION

In view of the above-described shortcomings and deficiencies in the prior art, an object of the present invention is to provide a novel and improved optical lens assembly and imaging device capable of obtaining high resolution while maintaining the miniaturization of the lens assembly.

An object of the present invention is to provide an optical lens assembly and an imaging device, in which the settings of the shape and focal power of a third lens in the optical lens assembly contribute to obtaining high resolution while maintaining the miniaturization of the optical lens assembly.

An object of the present invention is to provide an optical lens assembly and an imaging device, in which a positive sheet is in the front and a negative sheet is in the rear in a fourth lens and a fifth lens cemented to each other, and light can be condensed by the positive sheet so as to reduce the rear-end aperture/size of the optical lens assembly.

An object of the present invention is to provide an optical lens assembly and an imaging device, in which a third lens is a glass lens so as to facilitate thermal compensation, and further, the third lens is an aspherical glass lens so as to further improve the resolution.

An object of the present invention is to provide an optical lens assembly and an imaging device, in which the optical length of an optical lens assembly can be significantly shortened by optimizing the shape of each lens and rationally assigning the focal power of each lens, and the resolution is improved while maintaining the miniaturization of the optical lens assembly.

An object of the present invention is to provide an optical lens assembly and an imaging device, in which a light stop being located between a third lens and a fourth lens contributes to effectively condensing light entering the optical system and reduce the lens sheet aperture of the optical system.

According to an aspect of the present invention, there is provided an optical lens assembly comprising, in order from an object side to an image side: a first lens being a meniscus lens having a negative focal power, the first lens having an object side surface being a convex surface, and an image side surface being a concave surface; a second lens having a negative focal power, an image side surface of the second lens being a concave surface; a third lens being a meniscus lens having a positive focal power, the third lens having an object side surface being a concave surface, and an image side surface being a convex surface; a fourth lens; a fifth lens cemented to the fourth lens; and a sixth lens having a positive focal power.

In the optical lens assembly described above, the fourth lens is a biconvex lens having a positive focal power, of which an object side surface is a convex surface, and an image side surface is a convex surface; and the fifth lens is a meniscus lens having a negative focal power, of which an object side surface is a concave surface, and an image side surface is a convex surface.

In the optical lens assembly described above, the second lens is a meniscus lens, of which an object side surface is a convex surface.

In the optical lens assembly described above, the second lens is a biconcave lens, of which an object side surface is a concave surface.

In the optical lens assembly described above, the sixth lens has an object side surface being a convex surface, and an image side surface being a convex surface.

In the optical lens assembly described above, four or more lenses of the first to sixth lenses are aspherical lenses.

In the optical lens assembly described above, the second lens, the fourth lens, the fifth lens, and the sixth lens are aspherical lenses.

In the optical lens assembly described above, the second lens, the third lens, the fourth lens, the fifth lens, and the sixth lens are aspherical lenses.

In the optical lens assembly described above, the third lens is a glass lens.

In the optical lens assembly described above, the third lens is a glass aspherical lens.

In the optical lens assembly described above, the optical lens assembly further comprises a light stop, the light stop being located between the third lens and the fourth lens.

In the optical lens assembly described above, the first to sixth lenses satisfy the following conditional expression (1):

$$F3/F \leq 5.5 \quad (1)$$

where F3 is a focal length of the third lens, and F is a focal length value of an entire unit of the optical lens assembly.

In the optical lens assembly described above, the first to sixth lenses satisfy the following conditional expression (2):

$$TTL/F \leq 14.5 \quad (2)$$

where F is a focal length value of an entire unit of the optical lens assembly, and TTL is an optical length of the optical lens assembly.

According to another aspect of the present invention, there is provided an imaging device comprising the above-described optical lens assembly and an imaging element for converting an optical image formed by the optical lens assembly into an electrical signal.

In the optical lens assembly and the imaging device provided by the present invention, the settings of the shape and focal power of the third lens in the optical lens assembly contribute to obtaining high resolution while maintaining the miniaturization of the optical lens assembly.

Further, in the optical lens assembly and the imaging device provided by the present invention, the optical length of the optical lens assembly can be significantly shortened by optimizing the shape of each lens and rationally assigning the focal power of each lens, and the resolution is improved while maintaining the miniaturization of the optical lens assembly.

DETAILED DESCRIPTION OF THE EMBODIMENTS

The following description is used to disclose the present invention to enable those skilled in the art to practice the present invention. Preferred embodiments in the following description are by way of example only, and other obvious modifications are conceivable to those skilled in the art. The basic principles of the present invention as defined in the following description may be applied to other embodiments, modifications, improvements, equivalents, and other embodiments without departing from the spirit and scope of the present invention.

The terms and phrases used in the following description and claims are not limited to their literal meanings, but are used by the inventors only to enable a clear and consistent understanding of the present invention. Therefore, it is obvious to those skilled in the art that the following description of various embodiments of the present invention is provided only for the purpose of illustration rather than for the purpose of limiting the present invention as defined by the appended claims and their equivalents.

The terms used herein are only for the purpose of describing various embodiments and are not intended to be limiting. As used herein, a singular form is also intended to include a plural form, unless the context clearly indicates the exceptions. In addition, it will be understood that the terms "include/comprise" and/or "have", when used in the description, designate the existence of the described features, number, steps, operations, components, elements, or combinations thereof, without excluding the existence or addition of one or more other features, numbers, steps, operations, components, elements, or combinations thereof.

The terms used herein, including technical and scientific terms, have the same meanings as the terms commonly understood by those skilled in the art, as long as the terms are not defined differently. It should be understood that terms defined in a commonly used dictionary have meanings consistent with the meanings of the terms in the prior art.

The present invention will be further described in detail below with reference to the accompanying drawings and specific embodiments:

[Configuration of Optical Lens Assembly]

An optical lens assembly according to an embodiment of the present invention includes, in order from an object side to an image side: a first lens being a meniscus lens having a negative focal power, of which an object side surface is a convex surface, and an image side surface is a concave surface; a second lens being a lens having a negative focal power, of which an image side surface is a concave surface; a third lens being a meniscus lens having a positive focal power, of which an object side surface is a concave surface, and an image side surface is a convex surface; a fourth lens; a fifth lens cemented to the fourth lens; and a sixth lens being a biconvex lens having a positive focal power, of which an object side surface is a convex surface, and an image side surface is a convex surface.

In the optical lens assembly according to the embodiment of the invention, the settings of the shape and focal power of the third lens in the optical lens assembly contribute to obtaining high resolution while maintaining the miniaturization of the optical lens assembly, which will be described in further detail later.

In the optical lens assembly described above, preferably, the fourth lens is a biconvex lens having a positive focal power, of which an object side surface is a convex surface and an image side surface is a convex surface. In addition, the fifth lens is a meniscus lens having a negative focal power, of which an object side surface is a concave surface, and an image side surface is a convex surface. In this way, when viewing from an incident direction of light, a positive sheet is in the front and a negative sheet is in the rear, and the light can be condensed by the positive sheet so as to reduce the rear-end aperture/size of the optical lens assembly.

In the optical lens assembly described above, the second lens is a meniscus lens having a negative focal power or a biconcave lens having a negative focal power. That is to say, the image side surface of the second lens is a concave surface, and the object side surface may be a convex surface or a concave surface.

In the optical lens assembly described above, preferably, four or more lenses of the first to sixth lenses are aspherical lenses.

In the optical lens assembly described above, preferably, the third lens is a glass lens, and more preferably, the third lens is an aspherical glass lens. When the third lens is a glass lens, it is advantageous for thermal compensation. In addition, when the third lens is an aspherical glass lens, the resolution can be further improved. Here, it can be understood by those skilled in the art that in the optical lens assembly according to the embodiment of the present invention, the third lens is not merely limited to the glass lens or the aspherical glass lens. For example, the third lens may also be a plastic aspherical lens, which can achieve high resolution and a low cost, but has poor temperature performance. Therefore, in practical applications, the lens surface shape and material of the third lens can be determined according to specific demands.

Preferably, in the optical lens assembly described above, the first to sixth lenses satisfy the following conditional expressions (1) and (2):

$$F3/F \leq 5.5 \qquad (1)$$

$$TTL/F \leq 14.5 \qquad (2)$$

where F3 is a focal length of the third lens, F is a focal length value of the entire unit of the optical lens assembly, and TTL is an optical length of the optical lens assembly, namely, a distance from the outermost point of the object side of the first lens to an imaging focal plane.

Therefore, in the optical lens assembly according to the embodiment of the present invention, since the settings of the meniscus shape and the positive focal power of the third lens contribute to the formation of a short TTL, a miniaturized optical lens assembly is thus obtained. Therefore, in the optical lens assembly according to the embodiment of the invention, the lens surface shape and material of the third lens are not limited.

Here, it can be understood by those skilled in the art that, in addition to the settings of the shape and focal power of the third lens, in the optical lens assembly according to the embodiment of the present invention, the TTL can be significantly shortened by optimizing the shape of each lens and rationally assigning the focal power of each lens, and the resolution is improved while maintaining the miniaturization of the optical lens assembly.

In the optical lens assembly described above, it further includes a light stop. Preferably, the light stop is located between the third lens and the fourth lens, which is advantageous to effectively condense light entering the optical system and reduce the lens sheet aperture of the optical system. Of course, it can be understood by those skilled in the art that the light stop may also be located between any other discrete lenses.

In addition, in the case where the optical lens assembly according to the embodiment of the present invention includes the light stop, considering the balance of the system aberration and the rationality of the structure, it is preferable to dispose the fourth lens and the fifth lens cemented to each other at a position close to the light stop.

Hereinafter, the structures and functions of the first to sixth lenses in the optical lens assembly according to the embodiment of the present invention will be further described in detail.

In the optical lens assembly according to the embodiment of the invention, the first lens has a meniscus shape convex toward the object side, of which the object side surface is a convex surface, and the image side surface is a concave surface. The first lens is curved convexly toward the object side, so that an incident angle of incident light on an attacking surface can be small, which is advantageous for collecting more light into the optical system of the embodiment of the present invention. In addition, when being applied to a vehicle-mounted front view lens assembly, considering the outdoor installation environment of the vehicle-mounted lens assembly, for example, it may encounter severe weather such as rain or snow. The convex surface is advantageous for adapting to the outdoor use of the vehicle-mounted front view lens assembly. For example, when in an environment such as a rainy day, the convex surface can contribute to the falling of water droplets, thereby reducing the influence on the imaging.

In addition, the first lens may be a spherical glass lens or an aspherical glass lens. When the first lens is a spherical glass lens, the cost of the optical lens assembly can be reduced. However, when the first lens is an aspherical glass lens, the front-end aperture of the lens assembly can be reduced, the overall volume of the lens assembly can be reduced, and the resolution can be further improved.

In the optical lens assembly according to the embodiment of the present invention, the second lens is a meniscus lens or a biconcave lens having an image side surface being a concave surface, of which the object side surface may be a convex surface or a concave surface. Since the first lens of the optical lens assembly is a diverging lens, the light collected by the first lens is compressed by using the configuration of the second lens, so that the light trends to be relatively smooth, and thereby the light smoothly transitions to the rear.

In the optical lens assembly according to the embodiment of the invention, the third lens has a meniscus shape concave toward the object side, of which the object side surface is a concave surface, and the image side surface is a convex surface. The third lens is a converging lens, so that divergent light smoothly enters the rear. In addition, the third lens may balance and compensate the spherical aberration and positional chromatic aberration introduced by the first lens and the second lens. Moreover, as described above, the settings of the shape and focal power of the third lens are more rational, which is advantageous for maintaining the high resolution of the entire optical lens assembly while shortening the total length of the optical system.

In the optical lens assembly according to the embodiment of the invention, the light stop is located between the third lens and the fourth lens and the fifth lens cemented to each other, for condensing the front and rear light, shortening the total length of the optical system, and reducing the aperture of the front and rear lens groups.

In the optical lens assembly according to the embodiment of the invention, the fourth lens and the fifth lens cemented to each other can correct the chromatic aberration by themselves, reduce the tolerance sensitivity, and can also remain a part of chromatic aberration to balance the chromatic aberration of the system. In addition, when viewing from the incident direction of the light, the positive sheet with the positive focal power is in the front and the negative sheet with the negative focal power is in the rear, so that the front light can be further converged and then transitions to the rear so as to reduce the rear-end aperture/size of the optical lens assembly, thereby further reducing the total length of the system.

In the optical lens assembly according to the embodiment of the invention, the sixth lens is a biconvex lens, of which the object side surface is a convex surface and the image side surface is a convex surface. In this way, the sixth lens is a converging lens so that the light is converged. In addition, preferably, the sixth lens is an aspherical lens, which can satisfy a system with a small FNO, for example, FNO≤2, while reducing the optical path of the peripheral light reaching the imaging plane. Moreover, with the aspherical surface, the sixth lens can play a good correction effect on the off-axis point aberration, and optimize the optical performance such as distortion and CRA.

Here, it can be understood by those skilled in the art that, in addition to the vehicle-mounted front view lens assembly, the optical lens assembly according to the embodiment of the present invention can also be applied to other applications that require lightweight, miniaturized, low-cost, and high-resolution lens assemblies. The embodiment of the present invention is not intended to impose any limitation on this.

[Numerical Examples of Optical Lens Assembly]

Hereinafter, specific embodiments and numerical examples of the optical lens assembly according to the embodiment of the present invention will be described with reference to the accompanying drawings and tables, and in these numerical examples, specific numerical values are applied to corresponding embodiments.

Some of the lenses used in the embodiments have an aspherical lens surface, and the aspherical surface shape is represented by the following expression (3):

$$Z(h) = \frac{ch^2}{1 + \sqrt{1 - (1+k)c^2h^2}} + Ah^4 + Bh^6 + Ch^8 + Dh^{10} + Eh^{12} \quad (3)$$

where $Z(h)$ is a rise of distance of an aspherical surface from a vertex of the aspherical surface at a position with a height of h along an optical axis direction.

$c=1/r$, r represents a radius of curvature of a lens surface, k is a conic coefficient, B, C, D and E are high-order aspherical coefficients, and e in the coefficients represents the scientific notation. For example, E-05 represents $10^{-5}$.

In addition, Nd represents a refractive index, and Vd represents an Abbe's coefficient.

First Embodiment

Figure 1:
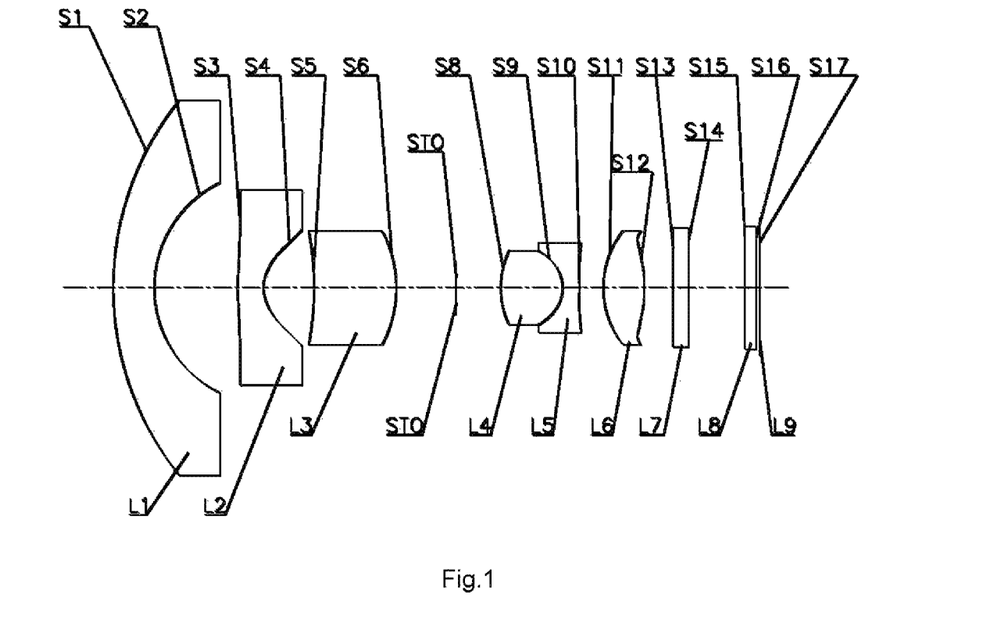
FIG. 1 illustrates a lens configuration of an optical lens assembly according to a first embodiment of the present invention.

FIG. 1 illustrates a lens configuration of an optical lens assembly according to a first embodiment of the present invention.

As shown in FIG. 1, the optical lens assembly according to the first embodiment of the present invention includes, in order from the object side to the image side: a meniscus-shaped first lens L1 with a negative focal power, having a first surface S1 convex toward the object side, and a second surface S2 concave toward the image side; a meniscus-shaped second lens L2 with a negative focal power, having a first surface S3 convex toward the object side, and a second surface S4 concave toward the image side; a meniscus-shaped third lens L3 with a positive focal power, having a first surface S5 concave toward the object side, and a second surface S6 convex toward the image side; a light stop STO; a fourth lens L4 and a fifth lens L5 cemented to each other, wherein the fourth lens L4 is of a biconvex shape having a positive focal power, and has a first surface S8 convex toward the object side and a second surface S9 convex toward the image side, and the fifth lens L5 is of a meniscus shape having a negative focal power, and has a first surface S9 concave toward the object side and a second surface S10 convex toward the image side; a biconvex-shaped sixth lens L6 with a positive focal power, having a first surface S11 convex toward the object side, and a second surface S12 convex toward the image side; a planar lens L7 having a first surface S13 toward the object side and a second surface S14 toward the image side, which is generally a color filter; a planar lens L8 having a first surface S15 toward the object side and a second surface S16 toward the image side, which is generally a protective glass for protecting the imaging plane; and L9 having an imaging plane S17, which is generally a chip.

Lens data of the above-described lens is shown in Table 1 below:

TABLE 1

| Surface | Radius | Thickness | Nd | Vd |
|---|---|---|---|---|
| 1 | 18.9422 | 1.0824 | 1.77 | 49.61 |
| 2 | 4.3000 | 2.5000 | | |
| 3 | 11.7094 | 1.0824 | 1.51 | 56.29 |
| 4 | 1.6321 | 1.7589 | | |
| 5 | −17.9436 | 2.8000 | 1.80 | 35.00 |
| 6 | −3.9704 | 0.5412 | | |
| STO | Infinite | 0.4059 | | |
| 8 | 6.5460 | 2.2000 | 1.51 | 56.00 |
| 9 | −0.8515 | 0.6765 | 1.58 | 35.00 |
| 10 | −36.5828 | 0.1353 | | |
| 11 | 4.6922 | 1.4864 | 1.63 | 28.00 |
| 12 | −4.5496 | 0.1353 | | |
| 13 | Infinite | 0.5000 | 1.52 | 64.21 |
| 14 | Infinite | 0.0348 | | |
| 15 | Infinite | 0.4000 | 1.52 | 64.21 |
| 16 | Infinite | 0.0650 | | |
| Image plane | Infinite | | | |

The conical coefficients k and high-order aspherical coefficients A, B, C, D and E of the surfaces S3 and S4 of the second lens, the surfaces S5 and S6 of the third lens, the surfaces S8, S9 and S10 of the fourth and fifth lenses, and the surfaces S11 and S12 of the sixth lens are as shown in Table 2 below.

TABLE 2

| Surface | k | A | B | C | D | E |
|---|---|---|---|---|---|---|
| 3 | −100.0000 | 3.2086E−04 | −2.1265E−04 | 1.3713E−05 | −3.0135E−07 | 1.1000E−08 |
| 4 | −2.2000 | 2.9965E−04 | 4.6121E−04 | 1.3270E−04 | −1.3511E−06 | 9.0775E−08 |
| 5 | 60.0000 | −1.8380E−04 | 8.1740E−05 | −1.2984E−04 | −2.4201E−05 | 6.3479E−06 |
| 6 | −4.5000 | 2.0053E−04 | −1.8735E−04 | −2.5864E−04 | 1.8301E−05 | −2.4694E−05 |

TABLE 2-continued

| Surface | k | A | B | C | D | E |
|---|---|---|---|---|---|---|
| 8 | 11.4700 | 1.7823E−02 | 7.5286E−04 | 1.7404E−03 | −3.5933E−03 | 1.2147E−03 |
| 9 | −0.8836 | −4.3637E−02 | 1.4743E−02 | −1.6556E−02 | 9.2488E−03 | −2.1040E−03 |
| 10 | 273.1383 | 1.8912E−03 | 2.1199E−03 | 3.9693E−04 | −4.3401E−04 | −1.0428E−04 |
| 11 | −8.3262 | 1.7324E−03 | 1.2799E−04 | −6.6879E−05 | 1.1923E−05 | −9.3930E−07 |
| 12 | −3.9115 | 4.7151E−03 | −1.1518E−04 | 2.5730E−04 | −3.1727E−05 | 9.1656E−07 |

In the optical lens assembly according to the first embodiment of the present invention, the focal length F3 of the third lens, the focal length value F of the entire unit of the optical lens assembly, and the optical length TTL of the optical lens assembly and the relationships therebetween are as shown in Table 3 below.

TABLE 3

| F3 | 5.815306 |
|---|---|
| F | 1.2717 |
| TTL | 15.8042 |
| F3/F | 4.572859951 |
| TTL/F | 12.42758355 |

As can be seen from the above Table 3, the optical lens assembly according to the first embodiment of the present invention satisfies the aforementioned conditional expressions (1) and (2), thereby obtaining high resolution while maintaining the miniaturization of the optical lens assembly.

Second Embodiment

Figure 2:
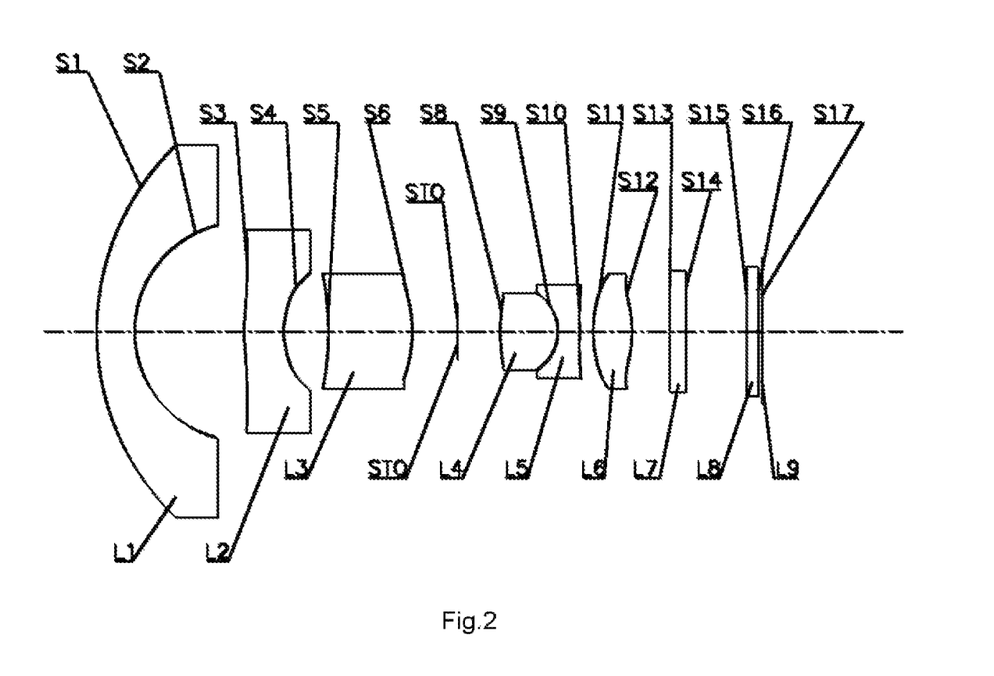
FIG. 2 illustrates a lens configuration of an optical lens assembly according to a second embodiment of the present invention.

FIG. 2 illustrates a lens configuration of an optical lens assembly according to a second embodiment of the present invention.

As shown in FIG. 2, the optical lens assembly according to the second embodiment of the present invention includes, in order from the object side to the image side: a meniscus-shaped first lens L1 with a negative focal power, having a first surface S1 convex toward the object side, and a second surface S2 concave toward the image side; a meniscus-shaped second lens L2 with a negative focal power, having a first surface S3 convex toward the object side, and a second surface S4 concave toward the image side; a meniscus-shaped third lens L3 with a positive focal power, having a first surface S5 concave toward the object side, and a second surface S6 convex toward the image side; a light stop STO; a fourth lens L4 and a fifth lens L5 cemented to each other, wherein the fourth lens L4 is of a biconvex shape having a positive focal power, and has a first surface S8 convex toward the object side and a second surface S9 convex toward the image side, and the fifth lens L5 is of a meniscus shape having a negative focal power, and has a first surface S9 concave toward the object side and a second surface SW convex toward the image side; a biconvex-shaped sixth lens L6 with a positive focal power, having a first surface S11 convex toward the object side, and a second surface S12 convex toward the image side; a planar lens L7 having a first surface S13 toward the object side and a second surface S14 toward the image side, which is generally a color filter; a planar lens L8 having a first surface S15 toward the object side and a second surface S16 toward the image side, which is generally a protective glass for protecting the imaging plane; and L9 having an imaging plane S17, which is generally a chip.

Lens data of the above-described lens is shown in Table 4 below:

TABLE 4

| Surface | Radius | Thickness | Nd | Vd |
|---|---|---|---|---|
| 1 | 15.0000 | 0.8000 | 1.88 | 49.61 |
| 2 | 3.0000 | 1.4000 | | |
| 3 | 10.0000 | 0.9000 | 1.65 | 25.00 |
| 4 | 1.3000 | 0.9000 | | |
| 5 | −20.5000 | 2.9000 | 1.65 | 24.00 |
| 6 | −3.4523 | 0.4000 | | |
| STO | Infinite | 0.3000 | | |
| 8 | 5.7027 | 1.9000 | 1.53 | 56.07 |
| 9 | −1.5000 | 0.5000 | 1.64 | 23.53 |
| 10 | −32.1000 | 0.1059 | | |
| 11 | 4.0466 | 1.2000 | 1.53 | 56.07 |
| 12 | −3.9769 | 0.0999 | | |
| 13 | Infinite | 0.5500 | 1.52 | 64.21 |
| 14 | Infinite | 0.4494 | | |
| 15 | Infinite | 0.4000 | 1.52 | 64.21 |
| 16 | Infinite | 2.6513 | | |
| Image plane | Infinite | | | |

The conical coefficients k and high-order aspherical coefficients A, B, C, D and E of the surfaces S3 and S4 of the second lens, the surfaces S5 and S6 of the third lens, the surfaces S8, S9 and S10 of the fourth and fifth lenses, and the surfaces S11 and S12 of the sixth lens are as shown in Table 5 below.

TABLE 5

| Surface | k | A | B | C | D | E |
|---|---|---|---|---|---|---|
| 3 | −80.0000 | 4.8018E−04 | −4.2988E−04 | 3.6609E−05 | −1.0675E−06 | 5.5822E−07 |
| 4 | −0.5000 | 4.5327E−03 | 9.7196E−04 | 3.6714E−04 | −4.7687E−05 | 4.1918E−06 |
| 5 | 58.0000 | −2.6974E−03 | 1.6130E−03 | −3.5298E−04 | −8.3369E−05 | 2.9957E−05 |
| 6 | −10.0000 | 3.0601E−04 | −3.7186E−04 | −7.1133E−04 | 6.2489E−05 | 0.0000E+00 |
| 8 | 15.0000 | 2.7180E−02 | 1.1327E−03 | 4.5140E−03 | −1.2699E−02 | 5.7306E−03 |
| 9 | −0.7000 | −6.4043E−02 | 2.9127E−02 | −4.4537E−02 | 5.2769E−02 | −9.8010E−03 |
| 10 | 250.0000 | 2.9380E−03 | 4.3431E−03 | 1.0727E−03 | −1.5269E−04 | −4.9561E−05 |
| 11 | −5.0000 | 2.8688E−03 | 2.6012E−03 | −1.2365E−04 | 4.3042E−04 | −4.3041E−05 |
| 12 | −8.8000 | 7.2289E−03 | −2.1913E−04 | 6.7758E−04 | −1.1743E−04 | 4.1572E−05 |

In the optical lens assembly according to the second embodiment of the present invention, the focal length F3 of the third lens, the focal length value F of the entire unit of the optical lens assembly, and the optical length TTL of the optical lens assembly and the relationships therebetween are as shown in Table 6 below.

TABLE 6

| | |
|---|---|
| F3 | 5.931736 |
| F | 1.10127 |
| TTL | 15.4565 |
| F3/F | 5.386268581 |
| TTL/F | 14.03515941 |

As can be seen from the above Table 6, the optical lens assembly according to the second embodiment of the present invention satisfies the aforementioned conditional expressions (1) and (2), thereby obtaining high resolution while maintaining the miniaturization of the optical lens assembly.

Third Embodiment

Figure 3:
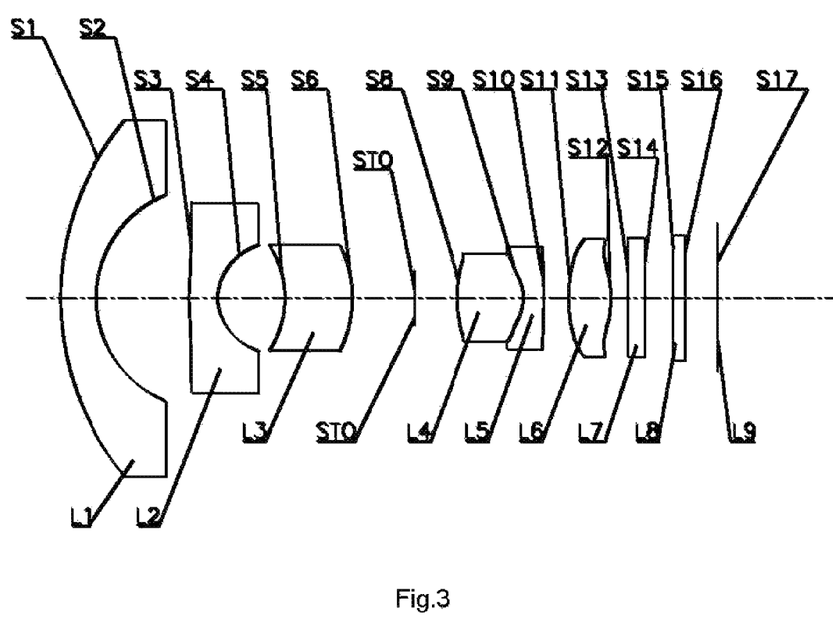
FIG. 3 illustrates a lens configuration of an optical lens assembly according to a third embodiment of the present invention.

FIG. 3 illustrates a lens configuration of an optical lens assembly according to a third embodiment of the present invention.

As shown in FIG. 3, the optical lens assembly according to the third embodiment of the present invention includes, in order from the object side to the image side: a meniscus-shaped first lens L1 with a negative focal power, having a first surface S1 convex toward the object side, and a second surface S2 concave toward the image side; a meniscus-shaped second lens L2 with a negative focal power, having a first surface S3 convex toward the object side, and a second surface S4 concave toward the image side; a meniscus-shaped third lens L3 with a positive focal power, having a first surface S5 concave toward the object side, and a second surface S6 convex toward the image side; a light stop STO; a fourth lens L4 and a fifth lens L5 cemented to each other, wherein the fourth lens L4 is of a biconvex shape having a positive focal power, and has a first surface S8 convex toward the object side and a second surface S9 convex toward the image side, and the fifth lens L5 is of a meniscus shape having a negative focal power, and has a first surface S9 concave toward the object side and a second surface S10 convex toward the image side; a biconvex-shaped sixth lens L6 with a positive focal power, having a first surface S11 convex toward the object side, and a second surface S12 convex toward the image side; a planar lens L7 having a first surface S13 toward the object side and a second surface S14 toward the image side, which is generally a color filter; a planar lens L8 having a first surface S15 toward the object side and a second surface S16 toward the image side, which is generally a protective glass for protecting the imaging plane; and L9 having an imaging plane S17, which is generally a chip.

Lens data of the above-described lens is shown in Table 7 below:

TABLE 7

| Surface | Radius | Thickness | Nd | Vd |
|---|---|---|---|---|
| 1 | 13.0000 | 0.9500 | 1.77 | 49.61 |
| 2 | 3.5000 | 1.9532 | | |
| 3 | 9.6970 | 0.9246 | 1.51 | 56.29 |
| 4 | 1.3963 | 1.4346 | | |
| 5 | −30.0000 | 2.6274 | 1.85 | 23.79 |
| 6 | −3.9566 | 0.6910 | | |
| STO | Infinite | 0.3000 | | |
| 8 | 4.4966 | 2.1530 | 1.51 | 60.00 |
| 9 | −0.9000 | 0.6000 | 1.64 | 23.53 |
| 10 | −31.4259 | 0.2195 | | |
| 11 | 3.6148 | 1.3829 | 1.53 | 56.07 |
| 12 | −3.1962 | 0.0999 | | |
| 13 | Infinite | 0.5500 | 1.52 | 64.21 |
| 14 | Infinite | 0.4494 | | |
| 15 | Infinite | 0.4000 | 1.52 | 64.21 |
| 16 | Infinite | 1.5142 | | |
| Image plane | Infinite | | | |

The conical coefficients k and high-order aspherical coefficients A, B, C, D and E of the surfaces S3 and S4 of the second lens, the surfaces S8, S9 and S10 of the fourth and fifth lenses, and the surfaces S11 and S12 of the sixth lens are as shown in Table 8 below.

TABLE 8

| Surface | k | A | B | C | D | E |
|---|---|---|---|---|---|---|
| 3 | −150.0000 | 4.1028E−04 | −4.4139E−04 | 3.5402E−05 | −1.1267E−06 | 1.2826E−08 |
| 4 | −1.2000 | 7.7724E−03 | 3.1758E−03 | 1.2543E−03 | −2.6210E−04 | 5.2830E−04 |
| 8 | −5.5874 | 1.0757E−02 | −3.9354E−03 | 6.9493E−03 | −1.0753E−02 | 4.9358E−03 |
| 9 | −2.7545 | −1.9753E−02 | 6.3093E−02 | −5.7279E−02 | 3.1369E−02 | −1.1042E−02 |
| 10 | 367.1095 | 2.1598E−03 | 3.6372E−03 | 7.8116E−04 | −2.2797E−04 | −6.5804E−05 |
| 11 | −20.1867 | 2.2618E−03 | 2.5660E−04 | −6.5855E−05 | 4.5729E−05 | −4.4022E−05 |
| 12 | −3.3288 | 8.1143E−03 | 1.3740E−04 | 7.7529E−04 | −9.5750E−05 | 4.5598E−06 |

In the optical lens assembly according to the third embodiment of the present invention, the focal length F3 of the third lens, the focal length value F of the entire unit of the optical lens assembly, and the optical length TTL of the optical lens assembly and the relationships therebetween are as shown in Table 9 below.

TABLE 9

| | |
|---|---|
| F3 | 5.098837 |
| F | 1.29303 |
| TTL | 16.2497 |
| F3/F | 3.943324594 |
| TTL/F | 12.56714848 |

As can be seen from the above Table 9, the optical lens assembly according to the third embodiment of the present invention satisfies the aforementioned conditional expressions (1) and (2), thereby obtaining high resolution while maintaining the miniaturization of the optical lens assembly.

Fourth Embodiment

Figure 4:
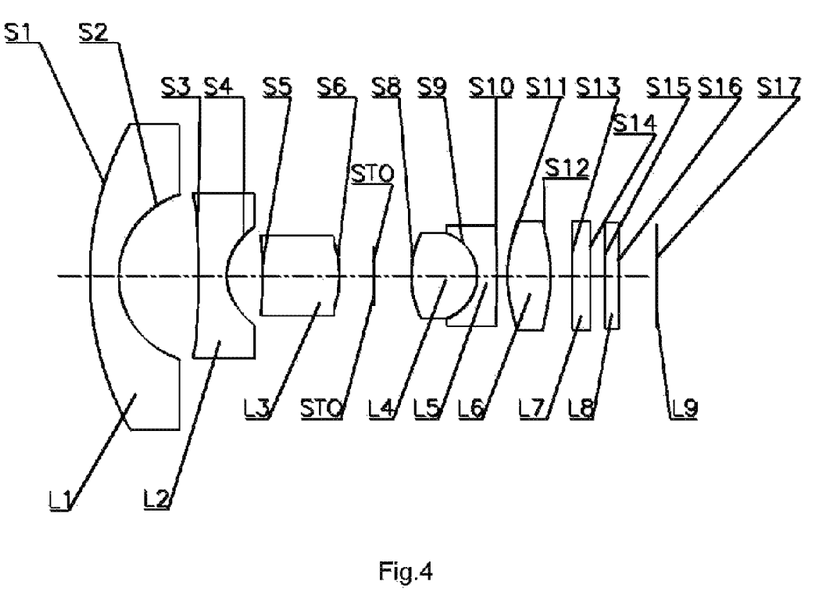
FIG. 4 illustrates a lens configuration of an optical lens assembly according to a fourth embodiment of the present invention.

FIG. 4 illustrates a lens configuration of an optical lens assembly according to a fourth embodiment of the present invention.

As shown in FIG. 4, the optical lens assembly according to the fourth embodiment of the present invention includes, in order from the object side to the image side: a meniscus-shaped first lens L1 with a negative focal power, having a first surface S1 convex toward the object side, and a second surface S2 concave toward the image side; a biconcave-shaped second lens L2 with a negative focal power, having a first surface S3 concave toward the object side, and a second surface S4 concave toward the image side; a meniscus-shaped third lens L3 with a positive focal power, having a first surface S5 concave toward the object side, and a second surface S6 convex toward the image side; a light stop STO; a fourth lens L4 and a fifth lens L5 cemented to each other, wherein the fourth lens L4 is of a biconvex shape having a positive focal power, and has a first surface S8 convex toward the object side and a second surface S9 convex toward the image side, and the fifth lens L5 is of a meniscus shape having a negative focal power, and has a first surface S9 concave toward the object side and a second surface S10 convex toward the image side; a biconvex-shaped sixth lens L6 with a positive focal power, having a first surface S11 convex toward the object side, and a second surface S12 convex toward the image side; a planar lens L7 having a first surface S13 toward the object side and a second surface S14 toward the image side, which is generally a color filter; a planar lens L8 having a first surface S15 toward the object side and a second surface S16 toward the image side, which is generally a protective glass for protecting the imaging plane; and L9 having an imaging plane S17, which is generally a chip.

Lens data of the above-described lens is shown in Table 10 below:

TABLE 10

| Surface | Radius | Thickness | Nd | Vd |
|---|---|---|---|---|
| 1 | 12.2752 | 0.9000 | 1.72 | 55.00 |
| 2 | 3.3496 | 2.9000 | | |
| 3 | −23.4509 | 1.0000 | 1.51 | 56.29 |
| 4 | 1.9611 | 1.7000 | | |
| 5 | −95.0426 | 2.8668 | 1.85 | 35.00 |
| 6 | −6.1402 | 0.0000 | | |
| STO | Infinite | 0.8295 | | |
| 8 | 4.2212 | 2.4174 | 1.51 | 56.07 |
| 9 | −1.5144 | 0.6000 | 1.64 | 23.53 |
| 10 | −37.4389 | 0.1000 | | |
| 11 | 4.0960 | 1.4000 | 1.51 | 56.07 |
| 12 | −5.8121 | 0.1248 | | |
| 13 | Infinite | 0.5500 | 1.52 | 64.21 |
| 14 | Infinite | 0.5617 | | |
| 15 | Infinite | 0.4000 | 1.52 | 64.21 |
| 16 | Infinite | 2.1366 | | |
| Image plane | Infinite | | | |

The conical coefficients k and high-order aspherical coefficients A, B, C, D and E of the surfaces S3 and S4 of the second lens, the surfaces S8, S9 and S10 of the fourth and fifth lenses, and the surfaces S11 and S12 of the sixth lens are as shown in Table 11 below.

TABLE 11

| Surface | k | A | B | C | D | E |
|---|---|---|---|---|---|---|
| 3 | −278.7684 | −4.6791E−04 | −1.7513E−04 | 4.7062E−05 | −4.8157E−07 | −3.9132E−08 |
| 4 | −0.6782 | 1.2865E−02 | 7.0339E−04 | 1.0232E−04 | −3.9198E−05 | 2.1190E−06 |
| 8 | −1.0294 | 4.7693E−03 | −1.1798E−03 | 2.3533E−03 | −8.5120E−04 | 9.1003E−05 |
| 9 | −6.7417 | −3.6174E−02 | 9.6175E−02 | −1.1909E−02 | 3.2355E−03 | −4.6031E−05 |
| 10 | 101.7998 | −1.7356E−03 | −2.8862E−05 | 1.7264E−05 | −8.1397E−06 | 5.1323E−06 |
| 11 | −9.0801 | −8.4684E−03 | 4.9802E−04 | −1.3406E−05 | 9.3601E−06 | 2.3446E−07 |
| 12 | 0.3102 | 2.0092E−03 | 1.4437E−04 | 1.6916E−04 | −2.1000E−05 | 1.0235E−05 |

In the optical lens assembly according to the fourth embodiment of the present invention, the focal length F3 of the third lens, the focal length value F of the entire unit of the optical lens assembly, and the optical length TTL of the optical lens assembly and the relationships therebetween are as shown in Table 12 below.

TABLE 12

| F3 | 7.563929 |
|---|---|
| F | 1.43342 |
| TTL | 18.4868 |
| F3/F | 5.276840703 |
| TTL/F | 12.89698762 |

As can be seen from the above Table 12, the optical lens assembly according to the fourth embodiment of the present invention satisfies the aforementioned conditional expressions (1) and (2), thereby obtaining high resolution while maintaining the miniaturization of the optical lens assembly.

In summary, in the optical lens assemblies according to the embodiments of the invention, the settings of the shape and focal power of the third lens in the optical lens assembly contribute to obtaining high resolution while maintaining the miniaturization of the optical lens assembly.

In the optical lens assemblies according to the embodiments of the invention, the positive sheet is in the front and the negative sheet is in the rear in the fourth lens and the fifth lens cemented to each other, and light can be condensed by the positive sheet so as to reduce the rear-end aperture/size of the optical lens assembly.

In the optical lens assemblies according to the embodiments of the invention, the third lens is a glass lens to facilitate thermal compensation, and further, the third lens is an aspherical glass lens so as to further improve the resolution.

In the optical lens assemblies according to the embodiments of the invention, the TTL can be significantly shortened by optimizing the shape of each lens and rationally assigning the focal power of each lens, and the resolution is improved while maintaining the miniaturization of the optical lens assembly.

In the optical lens assemblies according to the embodiments of the invention, the light stop being located between the third lens and the fourth lens contributes to effectively condensing light entering the optical system and reduce the lens sheet aperture of the optical system.

In the optical lens assemblies according to the embodiments of the invention, the fourth lens and the fifth lens cemented to each other are disposed at a position close to the light stop, which contributes to achieving the balance of the system aberration and the rationality of the structure.

In addition, in the optical lens assemblies according to the embodiments of the invention, the object side surface of the first lens is a convex surface, so that the incident angle of the incident light on the attacking surface is small, which is advantageous for collecting more light. Moreover, the object side surface of the first lens being a convex surface is advantageous for outdoor use of the optical lens assembly.

In addition, in the optical lens assemblies according to the embodiments of the invention, the first lens is a spherical glass lens, so that the cost of the optical lens assembly can be reduced. Moreover, due to the first lens being the aspherical glass lens, the front-end aperture of the lens assembly can be reduced, the overall volume of the lens assembly can be reduced, and the resolution can be further improved.

In addition, in the optical lens assemblies according to the embodiments of the invention, by the second lens having a negative focal power, the light collected by the first lens can be compressed by the configuration of the second lens, so that the light trends to be relatively smooth, and thereby the light smoothly transitions to the rear.

In addition, in the optical lens assemblies according to the embodiments of the invention, the third lens is a converging lens having a positive focal power, so that divergent light smoothly enters the rear. Moreover, the third lens may balance and compensate the spherical aberration and positional chromatic aberration introduced by the first lens and the second lens.

In addition, in the optical lens assemblies according to the embodiments of the invention, by the fourth lens and the fifth lens being cemented to each other, the fourth lens and the fifth lens can correct the chromatic aberration by themselves, reduce the tolerance sensitivity, and can also remain a part of chromatic aberration to balance the chromatic aberration of the system.

In addition, in the optical lens assemblies according to the embodiments of the invention, the sixth lens is a converging lens having a positive focal power, so that light is converged. Moreover, by the sixth lens being an aspherical lens, a system with a small FNO can be satisfied while reducing the optical path of the peripheral light reaching the imaging plane, and it can play a good correction effect on the off-axis point aberration, and optimize the optical performance such as distortion and CRA.

[Configuration of Imaging Device]

According to another aspect of the embodiment of the present invention, there is provided an imaging device comprising an optical lens assembly and an imaging element for converting an optical image formed by the optical lens assembly into an electrical signal. The optical lens assembly includes, in order from an object side to an image side: a first lens being a meniscus lens having a negative focal power, the first lens having an object side surface being a convex surface, and an image side surface being a concave surface; a second lens having a negative focal power, an image side surface of the second lens being a concave surface; a third lens being a meniscus lens having a positive focal power, the third lens having an object side surface being a concave surface, and an image side surface being a convex surface; a fourth lens; a fifth lens cemented to the fourth lens; and a sixth lens having a positive focal power.

Figure 5:
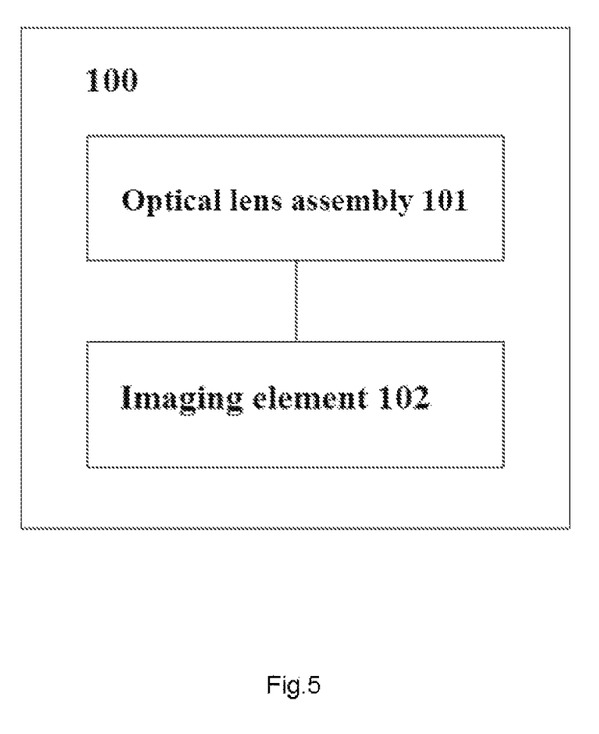
FIG. 5 is a schematic block diagram of an imaging device according to an embodiment of the present invention.

FIG. 5 is a schematic block diagram of an imaging device according to an embodiment of the present invention. As shown in FIG. 5, the imaging device 100 according to the embodiment of the present invention includes an optical lens assembly 101 and an imaging element 102. Herein, the optical lens assembly 101 is used to capture an optical image of a subject, and the imaging element 102 is used to convert the optical image captured by the optical lens assembly 101 into an electrical signal.

In the optical lens assembly described above, the fourth lens is a biconvex lens having a positive focal power, of which an object side surface is a convex surface, and an image side surface is a convex surface; and the fifth lens is a meniscus lens having a negative focal power, of which an object side surface is a concave surface, and an image side surface is a convex surface.

In the optical lens assembly described above, the second lens is a meniscus lens, of which an object side surface is a convex surface.

In the optical lens assembly described above, the second lens is a biconcave lens, of which an object side surface is a concave surface.

In the optical lens assembly described above, the sixth lens has an object side surface being a convex surface, and an image side surface being a convex surface.

In the optical lens assembly described above, four or more lenses of the first to sixth lenses are aspherical lenses.

In the optical lens assembly described above, the second lens, the fourth lens, the fifth lens, and the sixth lens are aspherical lenses.

In the optical lens assembly described above, the second lens, the third lens, the fourth lens, the fifth lens, and the sixth lens are aspherical lenses.

In the optical lens assembly described above, the third lens is a glass lens.

In the optical lens assembly described above, the third lens is a glass aspherical lens.

In the optical lens assembly described above, the optical lens assembly further comprises a light stop, the light stop being located between the third lens and the fourth lens.

In the optical lens assembly described above, the first to sixth lenses satisfy the following conditional expression (1):

$$F3/F \leq 5.5 \qquad (1)$$

where F3 is a focal length of the third lens, and F is a focal length value of an entire unit of the optical lens assembly.

In the optical lens assembly described above, the first to sixth lenses satisfy the following conditional expression (2):

$$TTL/F \leq 14.5 \qquad (2)$$

where F is a focal length value of an entire unit of the optical lens assembly, and TTL is an optical length of the optical lens assembly.

Here, it can be understood by those skilled in the art that other details of the optical lens assembly in the imaging device according to the embodiment of the present invention are the same as those described previously with respect to the optical lens assembly according to the embodiment of the present invention, and the aforementioned numerical examples of the optical lens assemblies of the first to the fourth embodiments of the present invention can be employed, and therefore they are not described again in order to avoid redundancy.

In the optical lens assembly and the imaging device provided by the embodiment of the present invention, the settings of the shape and focal power of the third lens in the optical lens assembly contribute to obtaining high resolution while maintaining the miniaturization of the optical lens assembly.

Further, in the optical lens assembly and the imaging device according to the embodiment of the invention, the TTL can be significantly shortened by optimizing the shape of each lens and rationally assigning the focal power of each lens, and so the resolution is improved while maintaining the miniaturization of the optical lens assembly.

In the optical lens assembly and the imaging device according to the embodiment of the invention, the positive sheet is in the front and the negative sheet is in the rear in the fourth lens and the fifth lens cemented to each other, and light can be condensed by the positive sheet so as to reduce the rear-end aperture/size of the optical lens assembly.

In the optical lens assembly and the imaging device according to the embodiment of the invention, the third lens is a glass lens to facilitate thermal compensation, and further, the third lens is an aspherical glass lens so as to further improve the resolution.

In the optical lens assembly and the imaging device according to the embodiment of the invention, the light stop being located between the third lens and the fourth lens contributes to effectively condensing light entering the optical system and reduce the lens sheet aperture of the optical system.

Further, in the optical lens assembly and the imaging device according to the embodiment of the invention, the fourth lens and the fifth lens cemented to each other are disposed at a position close to the light stop, which contributes to achieving the balance of the system aberration and the rationality of the structure.

In the optical lens assembly and the imaging device according to the embodiment of the invention, it is also possible to arrange lens(es) substantially having no diopter. Therefore, in addition to the first to sixth lenses described above, additional lens(es) can be disposed. In this case, the optical lens assembly and the imaging device according to the embodiment of the present invention may be configured with six or more lenses, and these lenses include additional lens(es) arranged in additional to the above-described first to sixth lenses.

It should be understood by those skilled in the art that the embodiments of the present invention described in the above description and illustrated in the accompanying drawings are only exemplary and not to limit the present invention. The objects of the present invention have been achieved completely and efficiently. The functional and structural principles of the present invention have been illustrated and explained in the embodiments, and the embodiments of the present invention may be varied or modified in any way without departing from the principles.

The invention claimed is:

1. An optical lens assembly, consisting of, in order from an object side to an image side:
   a first lens being a meniscus lens having a negative focal power, the first lens having an object side surface being a convex surface, and an image side surface being a concave surface;
   a second lens having a negative focal power, an image side surface of the second lens being a concave surface;
   a third lens being a meniscus lens having a positive focal power, the third lens having an object side surface being a concave surface, and an image side surface being a convex surface;
   a fourth lens;
   a fifth lens cemented to the fourth lens; and
   a sixth lens having a positive focal power,
   wherein the fourth lens is a biconvex lens having a positive focal power, of which an object side surface is a convex surface, and an image side surface is a convex surface,
   wherein the fifth lens is a meniscus lens having a negative focal power, of which an object side surface is a concave surface, and an image side surface is a convex surface.

2. The optical lens assembly according to claim 1, wherein the second lens is a meniscus lens, of which an object side surface is a convex surface.

3. The optical lens assembly according to claim 1, wherein the second lens is a biconcave lens, of which an object side surface is a concave surface.

4. The optical lens assembly according to claim 1, wherein four or more lenses of the first to sixth lenses are aspherical lenses.

5. The optical lens assembly according to claim 4, wherein the second lens, the fourth lens, the fifth lens, and the sixth lens are aspherical lenses.

6. The optical lens assembly according to claim 4, wherein the second lens, the third lens, the fourth lens, the fifth lens, and the sixth lens are aspherical lenses.

7. The optical lens assembly according to claim 1, wherein the third lens is a glass lens.

8. The optical lens assembly according to claim 7, wherein the third lens is a glass aspherical lens.

9. The optical lens assembly according to claim 1, wherein the optical lens assembly further comprises a light stop, the light stop being located between the third lens and the fourth lens.

10. The optical lens assembly according to claim 1, wherein the optical lens assembly satisfies the following conditional expression (1):

$$F3/F \leq 5.5 \quad (1)$$

where F3 is a focal length of the third lens, and F is a focal length value of the entire optical lens assembly.

11. The optical lens assembly according to claim 1, wherein the optical lens assembly satisfies the following conditional expression (2):

$$TTL/F \leq 14.5 \quad (2)$$

where F is a focal length value of the entire optical lens assembly, and TTL is an optical length of the optical lens assembly from the most object side surface of the most object side lens to the image plane.

12. An imaging device, comprising an optical lens assembly and an imaging element for converting an optical image formed by the optical lens assembly into an electrical signal, wherein the optical lens assembly consists of, in order from an object side to an image side:
   a first lens being a meniscus lens having a negative focal power, the first lens having an object side surface being a convex surface, and an image side surface being a concave surface;
   a second lens having a negative focal power, an image side surface of the second lens being a concave surface;
   a third lens being a meniscus lens having a positive focal power, the third lens having an object side surface being a concave surface, and an image side surface being a convex surface;
   a fourth lens;
   a fifth lens cemented to the fourth lens; and
   a sixth lens having a positive focal power,
   wherein the fourth lens is a biconvex lens having a positive focal power, of which an object side surface is a convex surface, and an image side surface is a convex surface, wherein the fifth lens is a meniscus lens having a negative focal power, of which an object side surface is a concave surface, and an image side surface is a convex surface.

13. The imaging device according to claim 12, wherein the second lens is a meniscus lens, of which an object side surface is a convex surface.

14. The imaging device according to claim 12, wherein the second lens is a biconcave lens, of which an object side surface is a concave surface.

15. The imaging device according to claim 12, wherein four or more lenses of the first to sixth lenses are aspherical lenses.

16. The imaging device according to claim 12, wherein the optical lens assembly further comprises a light stop, the light stop being located between the third lens and the fourth lens.

17. The imaging device according to claim 12, wherein the optical lens assembly satisfies the following conditional expression (1):

$$F3/F \leq 5.5 \tag{1}$$

where $F3$ is a focal length of the third lens, and $F$ is a focal length value of the entire optical lens assembly.

18. The imaging device according to claim 12, wherein the optical lens assembly satisfies the following conditional expression (2):

$$TTL/F \leq 14.5 \tag{2}$$

where $F$ is a focal length value of the entire optical lens assembly, and TTL is an optical length of the optical lens assembly from the most object side surface of the most object side lens to the image plane.

* * * * *